Patented Dec. 17, 1929

1,740,140

UNITED STATES PATENT OFFICE

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND

PRODUCTION OF FORMIC ACID

No Drawing.     Application filed September 12, 1925. Serial No. 56,056.

My invention relates to the production of formic acid by the combination of carbon monoxide and water in the presence of a catalytic agent. In my prior Patent #1,606,394, dated November 9, 1926, I have disclosed a process for making formic acid by passing a gaseous mixture of carbon monoxide and hydrogen under pressure over a cuprous chloride catalyst. I have now discovered that as a source of carbon monoxide and hydrogen, I can use as a starting material, a suitable gaseous mixture of carbon dioxide and hydrogen.

For this purpose, I prefer to utilize the gases generated by the butyl-acetonic fermentation of carbohydrates for the production of a suitable mixture of carbon monoxide and water vapor, and this procedure is one of the objects of my invention.

The gases evolved from the butyl-acetonic fermentation of carbohydrates contain approximately 45% of hydrogen and 55% of carbon dioxide by volume. I may utilize this gas mixture in my process for the production of formic acid, by first passing the gas over a catalytic mass such as reduced copper alone, or reduced copper in combination with another catalyst which will facilitate dehydration, as for example oxides of aluminum, titanium, thorium, or tungsten, or earthy materials such as kaolin.

The effect of such dehydrating and reducing catalysts is to cause the reduction of carbon dioxide to carbon monoxide in accordance with the following reaction:

$$CO_2 + H_2 \rightleftarrows CO + H_2O.$$

A convenient method for the preparation of a catalytic mass suitable for the transformation of butyl fermentation gases, or other gases comprising a mixture of carbon dioxide and hydrogen, to carbon monoxide and water, is to impregnate one of the dehydrating catalysts mentioned above with a solution of copper nitrate, bring the mixture to dryness by heating, and then reduce the copper nitrate contained in the mass to copper by reducing at a low temperature with hydrogen.

When fermenter gas from the butyl-acetonic fermentation, or other mixtures of carbon dioxide and hydrogen are passed over 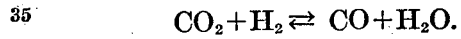 a catalytic substance of the type mentioned above at temperatures of from 350° to 450° at pressures varying above twenty atmospheres, a mixture containing some carbon monoxide and an equi-molecular proportion of water will be obtained. Such a gas is suitable for use in my process for the production of formic acid.

At a temperature of 420–450° a mixture of three volumes of hydrogen and one volume of carbon dioxide, when passed over a catalytic mass as above described, will yield about 10% of carbon monoxide, which represents a mixture in which 40% of the carbon oxides are present as carbon monoxide. On account of the greater ease of compressibility of water as compared to carbon dioxide, increased pressure will speed up the reaction.

In operating my novel process for the production of formic acid I may employ gas mixtures containing varying proportions of hydrogen and carbon dioxide, though for most efficient conversion of carbon dioxide to carbon monoxide I prefer to use the above-mentioned proportions. If gases from the butyl fermentation are employed as raw material, such gaseous mixture may be readily adjusted in its proportions of hydrogen to carbon dioxide by "scrubbing out" some of the carbon dioxide by methods well known in the art. The fermentation gas may, for example, be treated by scrubbing to contain three volumes of hydrogen per volume of carbon dioxide though such treatment is not essential to the operation of the process.

While I have specified a reaction temperature of 350–450° C. for the production of carbon monoxide, it should be understood that the reaction will proceed at a more rapid rate at a higher temperature. Since the use of temperatures above 500° C. tends to weaken the catalyst, I prefer to operate as above specified.

As set forth in my prior patent, I have discovered that cuprous chloride dissolved or suspended in solutions of strong acids such as sulfuric, hydrochloric, or phosphoric, is a suitable catalyst for the production of formic acid by the reaction of carbon monoxide and water.

The formic acid formed by the reaction of carbon monoxide and water vapor may or may not remain in the gaseous phase. The volatility of the formic acid will, of course, depend on its partial vapor pressure and its concentration. For example, at 1500 pounds pressure at 150° C. formic acid has a vapor pressure of 70 pounds and a saturation concentration of 4.6%.

If under these conditions the saturation concentration of formic acid in the gaseous mixture rises above 4.6%, some of the formic acid will be condensed in the chamber. Within wide limits it is possible to vary the physical state of the formic acid produced. For example, if formic acid is being formed in liquid state in the catalytic chamber an increase of the rate of flow of the incoming gas mixture will reduce the concentration of formic acid below the saturation point.

The formic acid produced by my process may thus be recovered in liquid state by draining the catalyst chamber wherein the reaction takes place, or by cooling the reaction vapors, whereupon formic acid will be condensed to liquid form.

Another object of my invention is to provide an economical and continuous process for the production of formic acid from mixtures of carbon dioxide and hydrogen such as are obtained, for example, in the butyl-acetonic fermentation or from similar sources.

To obtain formic acid by a continuous cyclic process from mixtures of carbon dioxide and hydrogen I may proceed in the following manner. The mixture of hydrogen and carbon dioxide at a pressure of 20 atmospheres or above, is passed over suitable reducing and dehydrating catalysts—i. e.—mixtures of reduced copper with various oxides, as was above described—at a temperature of about 350–450° C. In the case of a gaseous mixture containing three volumes of hydrogen to one volume of carbon dioxide, by a single passage over the catalyst, a gas containing about 10% carbon monoxide and an equi-molecular proportion of water vapor is obtained, the remainder of the gaseous mixture consisting of unchanged carbon dioxide and hydrogen.

This gas mixture is then cooled to about 150° C. and brought in contact with the cuprouschloride-acid catalyst, above described, under a pressure of 20 atmospheres or above. This reaction is preferably carried out by passing the gaseous mixture of carbon monoxide and water vapor together with the residual hydrogen and carbon dioxide over the cuprous chloride catalyst moistened with acid and deposited on a suitable surface-giving mass. As the result of the contact of the mixture of carbon monoxide and water vapor with the cuprous chloride catalyst under such conditions of temperature, pressure, and rate of flow that the formic acid is volatilized as formed, the reaction is continuous and substantially a gaseous one. The carbon dioxide and hydrogen present in the mixture do not interfere with the catalytic action and pass off the catalyst in gaseous form together with the formic acid formed, and any unconverted carbon monoxide and water vapor.

Subsequent to its passage over the catalyst, the gas mixture is cooled to the point at which the gaseous formic acid is condensed and the liquid formic acid is then removed from the system. On account of the similarity of boiling points of water and formic acid, some water will condense with the formic acid and leave a molecular excess of carbon monoxide in the gaseous mixture.

The gaseous residue is reheated and recirculated to produce more carbon monoxide which is reacted to form formic acid, these cycles of reaction continuing indefinitely. As fast as the original mixture of carbon dioxide and hydrogen is utilized, more is added. Some water must also be added to replace that condensed with the formic acid.

Now, having fully described my invention, I claim the following as new:—

1. A process for the production of formic acid which comprises reacting carbon monoxide and water in the presence of carbon dioxide and hydrogen under pressure in the presence of a catalyst containing cuprous chloride.

2. A process for the production of formic acid which comprises reacting carbon monoxide and water in the presence of carbon dioxide and hydrogen, at a pressure exceeding 20 atmospheres, in the presence of a catalyst containing a cuprous halide.

3. A process for the production of formic acid which comprises reacting carbon monoxide and water in the presence of carbon dioxide and hydrogen, at a temperature of between 50–150° C. and at a pressure exceeding 20 atmospheres, in the presence of a cuprous chloride catalyst.

4. A process for the production of formic acid which comprises subjecting to the action of a cuprous halide catalyst, a gas mixture obtained by the partial conversion of a mixture of carbon dioxide and hydrogen to carbon monoxide and water.

In testimony whereof I affix my signature.

WILLIAM C. ARSEM.